(12) United States Patent
Bonnefoy et al.

(10) Patent No.: US 9,364,886 B2
(45) Date of Patent: Jun. 14, 2016

(54) METHOD USING POWDER METALLURGY TO MANUFACTURE A DOG RING GEAR

(75) Inventors: Vincent Bonnefoy, Le Pont de Claix (FR); Jean-Luc Ebroussard, Le Pont de Claix (FR)

(73) Assignee: FEDERAL MOGUL SINTERTECH, Saint Jean De La Ruelle (FR)

( * ) Notice: Subject to any disclaimer, the term of this patent is extended or adjusted under 35 U.S.C. 154(b) by 1032 days.

(21) Appl. No.: 13/516,461

(22) PCT Filed: Nov. 16, 2010

(86) PCT No.: PCT/FR2010/052764
§ 371 (c)(1),
(2), (4) Date: Aug. 6, 2012

(87) PCT Pub. No.: WO2011/073581
PCT Pub. Date: Jun. 23, 2011

(65) Prior Publication Data
US 2012/0321499 A1    Dec. 20, 2012

(30) Foreign Application Priority Data
Dec. 16, 2009    (FR) .................................. 09 59055

(51) Int. Cl.
*B21K 1/30*     (2006.01)
*B22F 3/12*     (2006.01)
*F16D 11/00*    (2006.01)

(52) U.S. Cl.
CPC ... *B21K 1/30* (2013.01); *B22F 3/12* (2013.01); *F16D 11/00* (2013.01); *F16D 2011/008* (2013.01); *F16D 2250/00* (2013.01)

(58) Field of Classification Search
CPC .................................... B21K 1/30; B22F 3/12
USPC ........................................... 419/1, 8
See application file for complete search history.

(56) References Cited

U.S. PATENT DOCUMENTS 6,680,024 B1    1/2004   Grundner

FOREIGN PATENT DOCUMENTS

| EP | 0737540 A1 | 10/1996 |
| EP | 2025430 A1 | 2/2009 |
| FR | 2183774 | 12/1973 |

OTHER PUBLICATIONS

International Search Report dated Mar. 14, 2011 for related application No. PCT/FR2010/052764.

*Primary Examiner* — Brian Walck
(74) *Attorney, Agent, or Firm* — Howard IP Law Group, P.C.

(57) ABSTRACT

The invention relates to a method for manufacturing a dog ring gear, each dog being made up of a front portion and a rear portion, the method including the following steps: forming, by means of compression and sintering, a ring gear with dog preforms extending on all or part of the periphery thereof; and calibrating the sintered ring gear in a die including a front die half and a rear die half intended for engaging at the junction between the front and rear portions of the dogs, the thickness (A) of a rear portion (BP) of each preform, in the original plane of the dogs, being greater than the narrowest section (S1) of a groove formed in the rear die half and smaller than the thickest section (S2) of the groove, in the plane.

9 Claims, 4 Drawing Sheets

US 9,364,886 B2

1

METHOD USING POWDER METALLURGY TO MANUFACTURE A DOG RING GEAR

CROSS-REFERENCE TO RELATED APPLICATIONS

This application is the national stage application under 35 U.S.C. §371 of International Application No. PCT/FR2010/052764 and claims the benefit of Intl Application No. PCT/FR2010/052764, filed Dec. 16, 2010 and French Application No. 09/59055, filed Dec. 16, 2009, the entire disclosures of which are incorporated herein by reference in their entireties.

FIELD OF THE INVENTION

The present invention relates to a sintered dog clutch ring, of the type used in transmissions, and to a manufacturing method thereof

DISCUSSION OF PRIOR ART

A transmission comprises many parts having their positions varying in a gear shift so that the output axis of the transmission has a torque adapted to the movement resistance. Such transmissions are especially provided for the automobile field.

A conventional transmission especially comprises dog clutch rings solidly attached to idle gears (welded or shrunk on these gears) and intended to cooperate with sliding sleeves or spider couplings driven in rotation by a shaft of the transmission. This cooperation is achieved after a step of speed equalization between the shaft and the idle gear, by a locking step comprising a clutching between the dogs of the dog ring and those of the sliding sleeve.

FIGS. 1A to 1D respectively show a front view, a cross-section view, a partial enlarged cross-section view, and a partial simplified perspective view of a conventional dog ring.

The dog ring comprises a ring 10 having teeth or dogs 12 regularly distributed along its circumference. As shown in FIG. 1B, dogs 12 are supported by a thinned area 14 of the ring. It should be noted that the dogs may also be distributed in groups at the ring periphery.

As can be better seen in FIG. 1D, each dog 12 is delimited by a base surface 16, in contact with ring 10, by an upper surface 18 opposite to the base surface, by two front surfaces 20 having their intersection defining a front edge, and by two lateral rear surfaces 22 forming a back taper. Base surface 16 and upper surface 18 have similar shapes, formed of a generally triangular front portion, and of a generally trapezoidal rear portion. Each dog 12 widens between its upper surface 18 and its base surface 16, possibly linearly, but not necessarily. Most often, the widening profile is involute to a circle for surfaces 22. Diameter $d_{min}$ defined by base surfaces 16 is called the minor diameter and diameter $d_{maj}$ defined by upper surfaces 18 is the called major diameter. A pitch diameter $d_{prim}$, and thus a pitch plane, characteristic of the teething, and positioned between the minor and major diameters, is also defined ($d_{min} < d_{prim} < d_{maj}$). The characteristic geometries of a dog are generally defined in the pitch plane.

Call F the front portion or head of a dog delimited by front surfaces 20 and by the triangles forming the front portions of base surface 16 and upper surface 18, this portion being the first one to come in contact in a dog clutching. Call B the rear portion or foot of a dog delimited by lateral rear surfaces 22 and by the trapezoids forming the rear portions of base surface 16 and upper surface 18. The intersection between the head and the foot of a dog thus corresponds to the trapezoid defined by edges 23 between surfaces 20 and 22 and by the straight lines connecting the intersections of edges 23 with surfaces 18, 16, respectively. Rear portion B of the dog provides the back taper feature.

The dogs shown in FIG. 1D are symmetrical with respect to a central longitudinal plane of the dogs. It should be noted that asymmetrical dogs may also be provided, for which shapes 20 and 22 would be different on either side of the central longitudinal plane of the dogs.

FIGS. 2A to 2D are simplified longitudinal cross-section views, in the pitch plane of dogs, illustrating four steps of a dog clutching between two opposite dogs 24, 26, for example, dogs of a dog ring and of a sliding sleeve.

Dogs 24 and 26 comprise front portions, respectively $F_a$ and $F_b$, delimited by front surfaces, respectively 20a and 20b, and rear portions, respectively $B_a$ and $B_b$, delimited by lateral rear surfaces, respectively 22a and 22b. It should be noted that, in the pitch plane of the dogs, angles α and β (shown in FIG. 2A) are generally defined, respectively between front surfaces 20a and 20b and the central longitudinal axis of the dogs and between rear surfaces 22a and 22b and this same axis. In the case of an asymmetrical dog, different angles $α_1$ and $α_2$ and/or $β_1$ and $β_2$ are then defined on either side of the central longitudinal axis.

In an initial state (FIG. 2A), the coupling between dogs 24 and 26 is not engaged. Front portions $F_a$ and $F_b$ of the dogs are substantially but not necessarily located in front of each other. The dogs draw to each other until they come in contact with their front surfaces 20a, 20b (FIG. 2B). The sliding continues until intersection edges 23a and 23b between the front and rear surfaces of the dogs are in front of each other (FIG. 2C). A transition phase between the approach and the locking is then defined. Finally, the coupling is locked (FIG. 2D) when rear surfaces 22a and 22b of dogs 24 and 26 come in contact. It should be noted that, since the dogs have a general involute shape, the contact between dogs 24 and 26 is generally linear or point-shaped and located in the pitch plane of the dogs. Call overlap length $L_R$ the length, in the pitch plane, of the contact between dogs 24 and 26, at the step of FIG. 2D (locked dog clutching). This length defines the robustness of the device once locked, since it defines the useful area for the interlocking of the two parts and the area of transmission of the torque between the two dogs. Length $L_R$ thus defines the robustness of the anti-jump-out function provided by the dog ring and sliding sleeve assembly.

So that the dogs do not continue their relative displacement once the state of FIG. 2D has been reached, a stop is currently formed to the back of the dogs.

FIG. 3 is a perspective view of a portion of a dog ring in which such stops 28 are provided at the surface of the rear portion of dogs. The stop effect may also be obtained by a contact on one of the surfaces of ring 10 or of thinned area 14. It should be noted that, in the case where stops 28 are provided, the definition of the pitch and major diameters does not vary, the major diameter being the diameter defined by upper surfaces 18 (without taking the stops into account).

To form the front surfaces and the lateral rear surfaces of the dogs of a dog ring, a preform formed of a ring comprising teeth at its periphery may be machined. However, this machining is performed part by part, and thus tooth by tooth, and does not always provide a sufficient accuracy and reproducibility of the geometry of surfaces 20 and 22, as well as of the position of intersection edges 23, for large-scale applications (fluctuations from part to part, or even from tooth to tooth). Further, the edges between front and rear portions obtained by machining are generally sharp, which may cause jerks during the step of FIG. 2C of a dog clutching, and the generation of metal burrs.

To overcome problems linked to the obtaining of dog rings with machined dogs, it has been provided to form dog rings by powder metallurgy, that is, by compression, sintering, and calibration. The sintering comprises heating a blank formed by cold compression of a powder mixture to give it its mechanical cohesion. The calibration, or forming by deformation of the material, comprises having the sintered parts transit through a die to obtain more accurate dimensions and functional geometries. Thus, a part with the desired dimensions is directly obtained and the number of steps to be carried out, as well as the part manufacturing cost, are decreased. Advantageously, a single die is used for a large-scale production of parts, which provides a very good reproducibility from part to part. The geometric and dimensional quality of the dogs, tooth by tooth, is then directly linked to the quality of the tools.

During the calibration, two half-dies are pressed against each other on the preform obtained by sintering. A disadvantage of such a forming operation may be the forming, at the junction between the two half-dies, that is, at the junction between the front and rear portions of the dogs, of a prejudicial burr. The presence of this burr does not allow a high-quality dog clutching.

To avoid the forming of burrs, U.S. Pat. No. 6,680,024 provides using a die with its front half-die having, at the junction with the rear half-die, a slightly wider opening than the rear half-die. The front surfaces of the dog thus formed have, at the junction with the rear surfaces, a rounded shoulder which provides a jerk-free dog clutching. There however remains a set-back at the beginning of the rear portion (back taper area). Thus, the overlap of the back tapers of the dog ring and of the sliding sleeve only partially extends on the rear portion of the dogs, which does not provide a maximum overlap length optimized with respect to the dog size once the dog clutching is locked.

Thus, there is a need for a method using powder metallurgy to manufacture a dog ring, which overcomes the above-mentioned disadvantages to provide optimal functionalities.

SUMMARY

An object of an embodiment of the present invention is to provide a method using powder metallurgy to manufacture a dog ring.

Another object of an embodiment of the present invention is to provide a dog ring calibration die suitably sized to optimize the dog overlap length and provide an optimized dog clutching.

Thus, an embodiment of the present invention provides a method for manufacturing a dog ring, each dog being formed of a front portion and of a rear portion, the method comprising the steps of: forming, by compression and by sintering, a ring with dog preforms extending on all or part of its periphery; and calibrating the sintered ring in a die comprising a front half-die and a rear half-die intended to come in contact at the junction between the front and rear portions of the dogs, the thickness of a rear portion of each preform, in the pitch plane of the dogs, being greater than the narrowest section of a trench formed in the rear half-die and smaller than the thickest section of the trench.

According to an embodiment of the present invention, the dogs are distributed along the external periphery of the ring, the major diameter of the dog preform being smaller than the major diameter of the front and rear half-dies.

According to an embodiment of the present invention, the dogs are distributed along the internal periphery of the ring, the minor diameter of the dog preform being larger than the minor diameter of the front and rear half-dies.

According to an embodiment of the present invention, in the pitch plane of the dogs, the thickness of the rear portion of each preform ranges between the sum of seven eighths of the narrowest section and one eighth of the thickest section of the trench, and the sum of seven eighths of the thickest section and of one eighth of the narrowest section of the trench.

According to an embodiment of the present invention, in each plane defined by a diameter ranging between $d_{min}$ and $d_{maj}$, where $d_{min}$ designates the minor diameter and where $d_{maj}$ designates the major diameter of the ring, the thickness of the rear portion of each preform ranges between the narrowest section and the thickest section of the trench in the pitch plane of the dogs.

According to an embodiment of the present invention, in each plane defined by a diameter ranging between $d_{min}$ et $d_{maj}$, the thickness of the rear portion of each preform ranges between the sum of seven eighths of the narrowest section and one eighth of the thickest section of the trench in said plane, and the sum of seven eighths of the thickest section and of one eighth of the narrowest section of said trench in said plane.

According to an embodiment of the present invention, the bottom of the half-die is rounded.

According to an embodiment of the present invention, the pattern cavities in the front and rear half-dies extend to form stops at the surface of the rear portions of the dogs.

According to an embodiment of the present invention, the dogs are asymmetrical with respect to a central longitudinal plane of the dogs.

An embodiment of the present invention further provides a dog ring formed by the above-described method.

An embodiment of the present invention further provides a set of dies and tools capable of forming a dog ring by the above-described method.

An embodiment of the present invention further provides a mechanical device comprising dog ring formed by the above-described method.

BRIEF DESCRIPTION OF THE DRAWINGS

The foregoing and other objects, features and advantages of the present invention will be discussed in detail in the following non-limiting description of specific embodiments in connection with the accompanying drawings, among which.

It should be noted that, in the following description, the same elements have been designated with the same reference numerals in the different drawings and, further, that the various drawings are not to scale.

DETAILED DESCRIPTION

For clarity, only those elements which are useful to the understanding of the present invention have been shown and will be described. In particular, the manufacturing of the ring supporting the dogs has not been detailed, the invention being compatible with usual techniques for manufacturing such a ring. Further, unless otherwise specified, terms lateral, longitudinal, central, etc. are arbitrarily expressed in the orientation of the drawings.

It is provided to form, by compression, sintering, and calibration, rings with their dogs having slightly rounded intersections (to suppress angles), between their front and rear portions, thus providing a minimum transition phase during a dog clutching. Dogs having the largest possible overlap length are provided to be formed.

Figure 4:
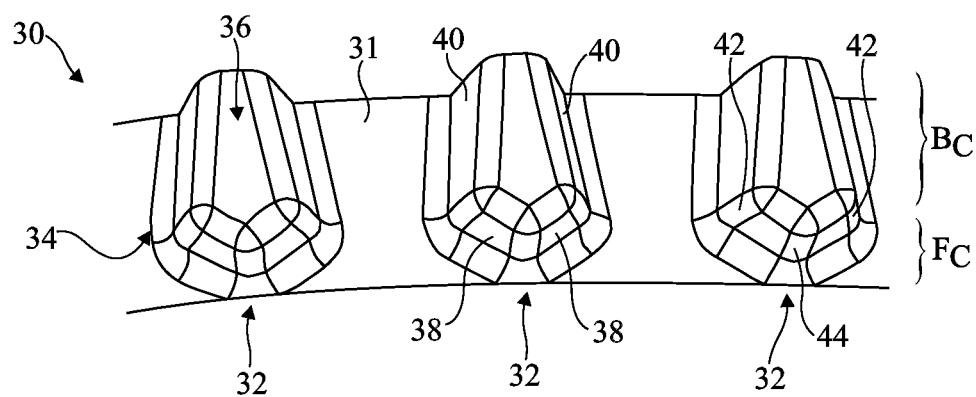
FIG. 4 is a partial perspective view of a dog ring according to an embodiment of the present invention.

FIG. 4 is a partial perspective view of an embodiment of a dog ring 30. In the shown example, the dogs are symmetrical with respect to a central longitudinal plane and are formed on all or part of the periphery of a ring 31 (only partly shown).

Each dog 32 comprises a front portion $F_C$ and a rear portion $B_C$. Dogs 32 are delimited by a base surface 34, in contact with ring 31 (at the minor diameter), and by an upper surface 36 (at the major diameter), which may have a smaller area than the base surface. Surfaces 34 and 36 have similar shapes, formed of a triangular front portion and of a trapezoidal rear portion. Front portion $F_C$ is delimited by two front surfaces 38 and rear portion $B_C$ is delimited by two rear lateral surfaces 40 forming a back taper. Intersection 42 between front and rear portions $F_C$ and $B_C$ of dogs 32 is rounded and front edge 44, at the intersection between the two front surfaces 38, is also rounded. Optionally, a radius may also be provided between upper surface 36 and each of rear lateral surfaces 40.

It should be noted that the structure shown in FIG. 4 is an embodiment only and that the method discussed herein applies to other dog shapes, especially to dogs having radiuses different from those discussed herein (different radiuses of connection between functional surfaces, except those between surfaces 38 and 40).

To form, by powder metallurgy, a dog ring such as that in FIG. 4, it is started by forming, by compression and by sintering, a ring comprising dog preforms at its periphery.

Figure 5:
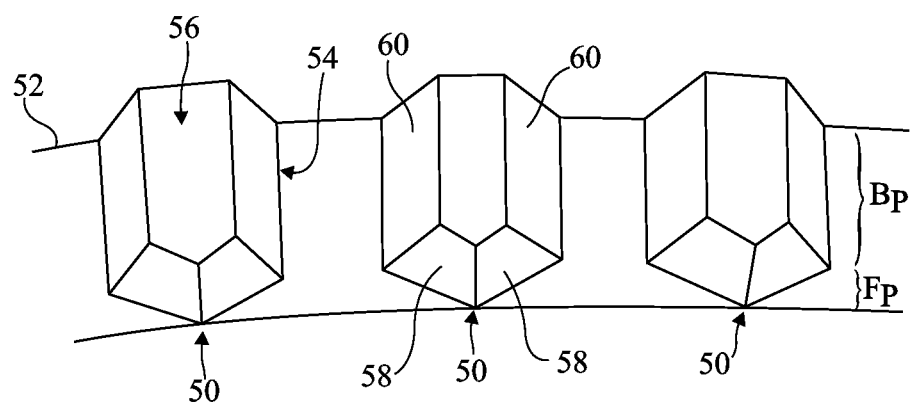
FIG. 5 is a partial simplified perspective view of a dog ring preform according to an embodiment of the present invention.

FIG. 5 is a simplified perspective view of such a structure comprising dog preforms 50 at the periphery of a ring 52 (only partly shown).

In the shown example, each preform 50 comprises a front portion $F_P$ and a rear portion $B_P$. Preforms 50 are delimited by a base surface 54, in contact with ring 52 (at the minor diameter), and by an upper surface 56 (at the major diameter), where upper surface 56 may have a smaller area than base surface 54. Base surface 54 and upper surface 56 have identical shapes, formed of a rear trapezoid and of a front triangle. In the shown example and in the following drawings, base surface 54 and upper surface 56 have rectangular rear portions. Front portion $F_P$ of each preform 50 is delimited by two surfaces 58 having their intersection defining a front edge and rear portion $B_P$ is defined by two lateral surfaces 60. Thus, the section of rear portion $B_P$ of dog preform 50 is constant along the entire height (defined in the front-to-back direction of the dogs) of this portion. The angle(s) between front surfaces 58 of preform 50 substantially correspond to the desired angles between front surfaces 38 of dogs 32. It should be noted that the preform may also be provided with radiuses between functional surfaces, not shown in FIG. 5.

Once the preform of the dog ring has been formed by compression and sintering, it is provided to calibrate it, that is, to plastically deform the material by application of mechanical stress, in a die of adapted dimensions.

Figure 6A:
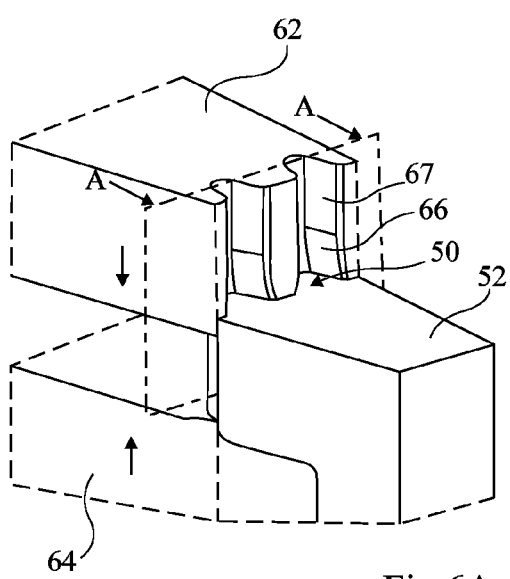
FIGS. 6A to 6D illustrate, in a perspective view and longitudinal cross-section views of a dog and of the die at the level of this dog, a method for calibrating a dog ring according to an embodiment of the present invention.
Figure 6B:
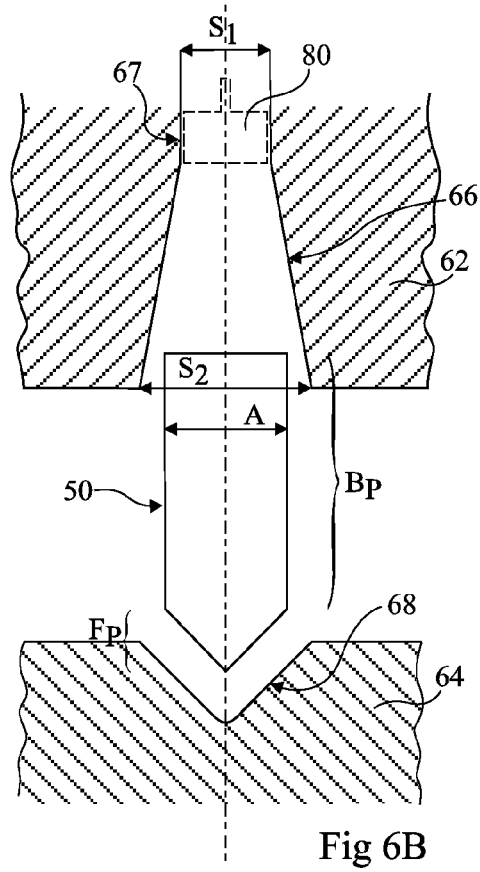
Figure 6C:
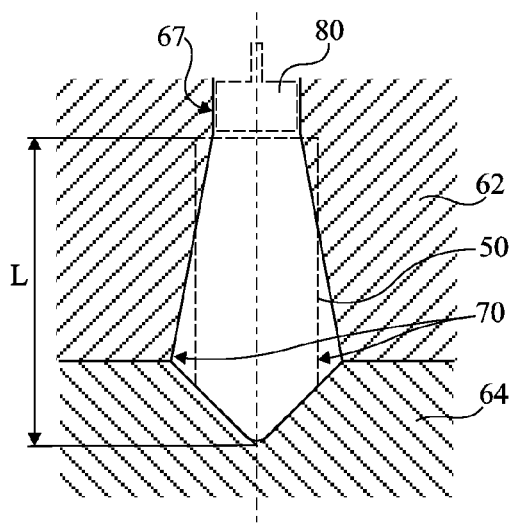
Figure 6D:
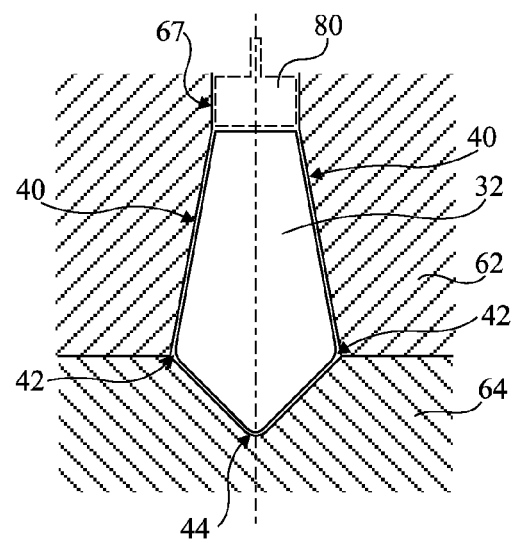

FIGS. 6A to 6D illustrate a method for calibrating a dog ring preform according to an embodiment, in the case of symmetrical dogs. FIG. 6A is a perspective view during the calibration and FIGS. 6B, 6C, and 6D are longitudinal cross-section views, in pitch plane A-A of FIG. 6A, respectively illustrating an initial step of the calibration, a superposition between the die which is used and the dog preform intended to be calibrated, and a final step of the forming (calibration).

The die comprises two half-dies 62 and 64 intended to close at the intersection between front and rear portions $F_C$ and $B_C$ of dogs 32. Half-die 62 is intended to form the rear portion of the dogs and half-die 64 is intended to form the front portion of the dogs. For each dog, rear half-die 62 comprises a trench 66 flared according to the final back taper angle to be achieved, for example, by an angle ranging between 2 and 8°, having its bottom continuing to form a groove of constant section 67. Groove 67 forms an opening in the back of the rear half-die. Call $S_1$ the narrowest section of trench 66 (at the bottom of the groove) and $S_2$ the thickest section thereof (at the contact of half-dies 62 and 64), in pitch plane A-A. In front, half-die 64 comprises a chamfered pattern cavity 68. The angle formed by the walls of pattern cavity 68 is equal to the desired final angle. The value of the angle formed by the two front surfaces 58 of dog preform 50 is provided to be on the order of the value of the angle formed by the walls of pattern cavity 68. The intersection between the two surfaces forming pattern cavity 68 is for example rounded. As a variation, a slight flat may be provided.

For asymmetrical dogs, flared trench 66 and chamfer 68 are asymmetrical with respect to the central longitudinal plane of the dogs.

As shown in the superposition of FIG. 6C, the die defines a free space 70, on either side of preform 50, at the interface of the two half-dies 62 and 64, and is narrower than the preform at the bottom of trench 66. Thus, during the calibration, the matter forming the back of the preform is compressed or swaged and tends, in a way, to enter groove 67. When the swaging and the motion in groove 67 are sufficient, they are blocked and the matter of the back of dog preform $B_P$ presses on the matter of the front of the preform $F_P$, which causes displacements of this matter towards free space 70.

To obtain the desired shape, the dimensions of the die and of the preform comply with the following relation:

$$S_1 < A < S_2,$$

where A designates the thickness of rear portion $B_P$ of the dog preform in the pitch plane (average thickness in the case of a trapezoidal shape), and preferably:

$$\frac{7S_1}{8} + \frac{S_2}{8} < A < \frac{S_1}{8} + \frac{7S_2}{8}.$$

This relation is preferably verified in any cross-section plane of the dogs defined by diameters ranging between $d_{min}$ and $d_{maj}$, $d_{min}$ being the minor diameter and $d_{maj}$ being the major diameter of the dog ring.

FIG. 6D illustrates the result obtained after calibration. During the calibration, since thickness $S_1$ is smaller than thickness A, the matter forming rear portion $B_P$ of dog preform 50 is compressed or swaged and presses on the dog preform with the front thereof, towards free space 70. Further, the presence of the radius at the top of the taper defined by the two surfaces of pattern cavity 68 presses on the tip of front portion $F_P$ of preform 50, and matter from the front of the preform displaces towards free space 70.

Cumulating and controlling the two above-described matter movements enables to form dog 32 having a rounded intersection between its front and rear portions $F_C$ and $B_C$ with no mark, since the matter remains in a slightly open volume and does not strictly follow the contact area between upper and lower dies 62 and 64.

Further, advantageously, dogs are formed which have a uniform back taper, with no mark, totally functional along their entire length, and thus providing a maximum overlap length. Thus, the calibration step enables to define flared rear lateral portions 40 of dog 32 and their angle, and the same is true for the angle(s) between front surfaces 38 of the dog.

During the calibration, which may be performed at cold or hot temperature, matter from preform 50 may slightly migrate into groove 67 of constant section. According to the amount of matter of the preform and to the volume of the calibration die, it may be provided to place a punch 80 (in dotted lines in FIGS. 6B to 6D) in groove 67 to control this amount of matter and, optionally, to perform a final compression of the preform.

Preferably, during the calibration, a functional clearance is provided between major diameter $d_{maj}$ of the dog preform and major diameter $d_{maj}$ of dies 62 and 64. As a result, the major diameter of the formed teething is greater than the major diameter of the preform in the case of an external teething.

The described method thus enables, in a single calibration step, to form a dog ring with dogs having rounded intersection edges between the flanks of the front and rear portions and having a maximum overlap length of the back taper area.

Specific embodiments of the present invention have been described. Various alterations and modifications will occur to those skilled in the art. In particular, it should be noted that the calibration method described herein may also be used to form internal teethings of a ring. In the case of an internal teething, call major diameter the diameter defined by the base surfaces of the dogs and minor diameter the diameter defined by the upper surfaces of the dogs (minor diameter<major diameter). Thus, for an internal teething, the condition of a clearance between the preform and the dies concerns minor diameters. A functional clearance is then preferably provided between the minor diameter of the preform and the minor diameter of dies 62 and 64. As a result, the minor diameter of the formed teething is smaller than the minor diameter of the preform.

It should further be noted that the method described herein applies to dogs which generally, but not necessarily, have an involute shape. It may also be applied to dogs with planar surfaces. The method also applies to the case where the characteristic angles of the front and rear surfaces are not constant (warped profiles).

Further, the method discussed herein applies to the forming of any mechanical part comprising an element having dogs formed thereon.

Figure 1A:
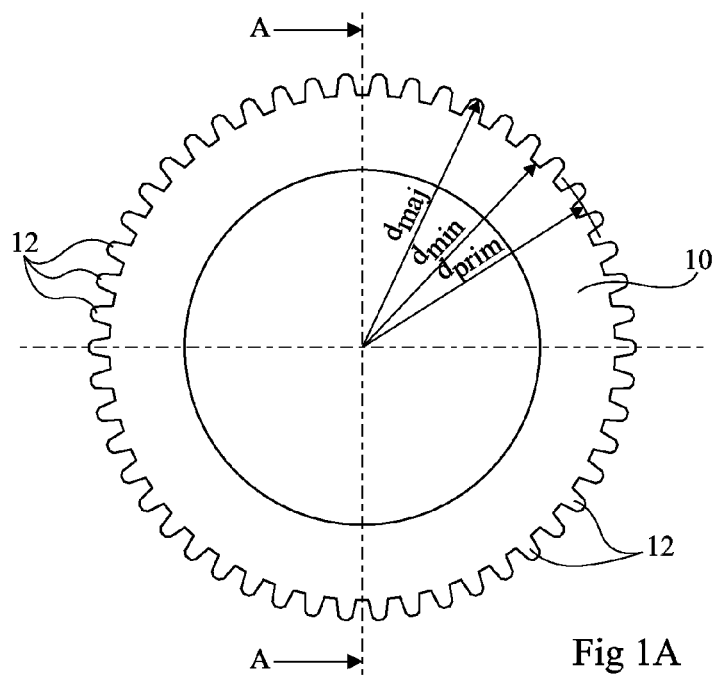
FIGS. 1A to 1D, previously described, respectively show a front view, a cross-section view, an enlarged partial cross-section view, and a simplified partial perspective view of a conventional dog ring.
Figure 1B:
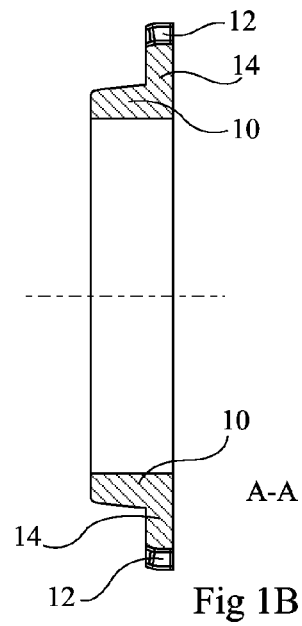
Figure 1C:
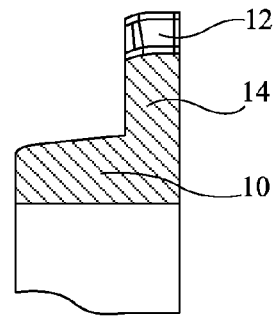
Figure 1D:
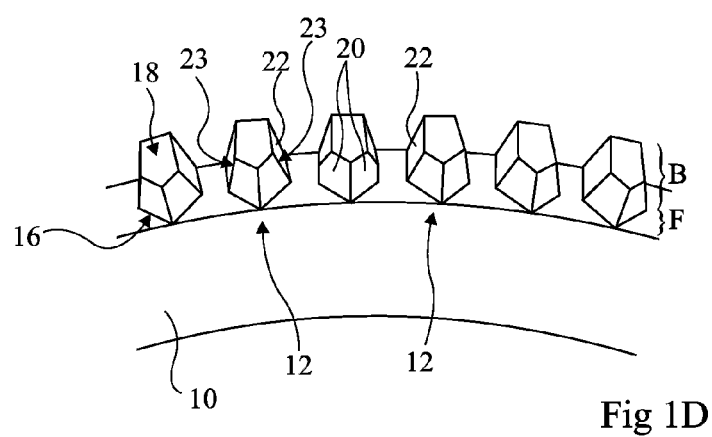
Figure 2A:
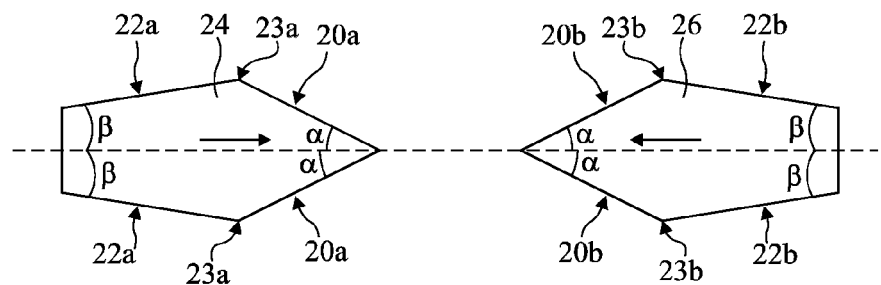
FIGS. 2A to 2D, previously described, illustrate different phases of a dog clutching.
Figure 2B:
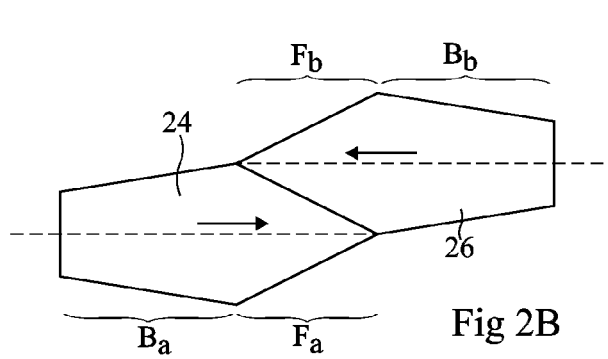
Figure 2C:
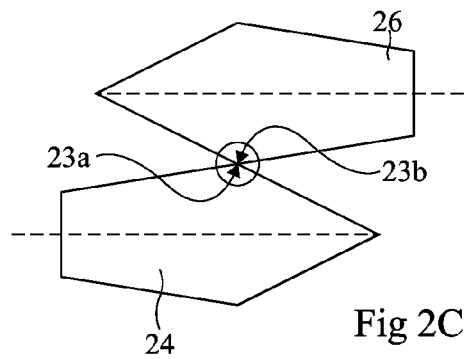
Figure 2D:
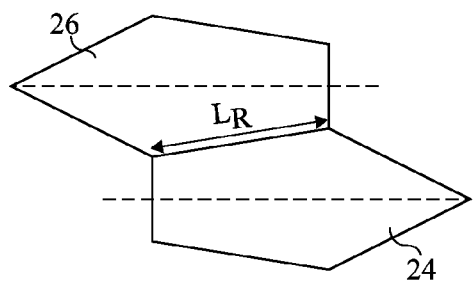
Figure 3:
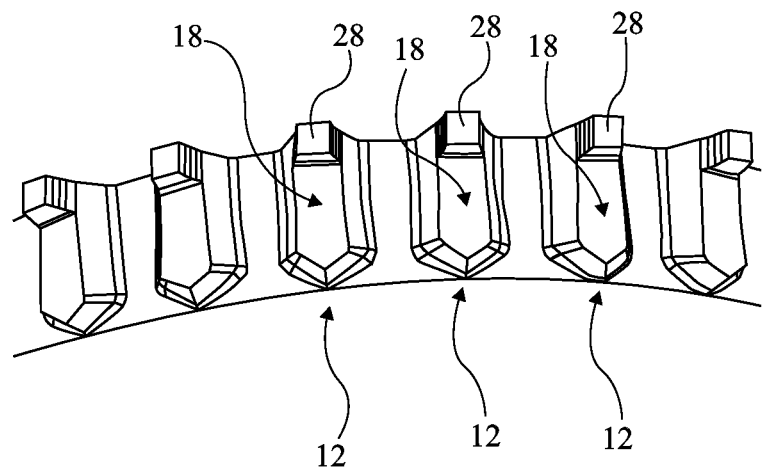
FIG. 3 is a perspective view of alternative dogs of a dog ring.

Further, the method discussed herein also applies to the forming of a dog ring in which stops such as those discussed in relation with FIG. 3 are provided to the back of the upper surface of the dogs. In this case, the front and rear half-dies used in the calibration will have pattern cavities adapted to the forming of such stops. They may especially be provided to come in contact, at the level of the dogs, along the delimitation between the front portion and the rear portion of the dogs, as described hereabove and, on the stops, at the level of the contour of the front surface thereof.

The invention claimed is:

1. A method for manufacturing a dog ring, each dog being formed of a front portion ($F_C$) and of a rear portion ($B_C$), the method comprising the steps of:
    forming, by compression and by sintering, a ring having dog preforms extending on all or part of its periphery; and
    calibrating the sintered ring in a die comprising a front half-die and a rear half-die intended to come in contact at the junction between the front and rear portions of the dogs,
    the thickness (A) of a rear portion ($B_P$) of each preform, in the pitch plane of the dogs, being greater than the narrowest section ($S_1$) of a trench in the rear half-die and smaller than the thickest section ($S_2$) of said trench, in said plane.

2. The method of claim 1, wherein the dogs are distributed along the external periphery of the ring, the major diameter of the dog preform being smaller than the major diameter of the front and rear half-dies.

3. The method of claim 1, wherein the dogs are distributed along the internal periphery of the ring, the minor diameter of the dog preform being greater than the minor diameter of the front and rear half-dies.

4. The method of claim 1, wherein, in the pitch plane of the dogs, the thickness (A) of the rear portion of each preform ranges between the sum of seven eighths of the narrowest section ($S_1$) and one eighth of the thickest section ($S_2$) of the trench, and the sum of seven eighths of the thickest section and of one eighth of the narrowest section of said trench.

5. The method of claim 1, wherein in each plane defined by a diameter ranging between $d_{min}$ and $d_{maj}$, where $d_{min}$ designates the minor diameter and where $d_{maj}$ designates the major diameter of the ring, the thickness of the rear portion of each preform ranges between the narrowest section and the thickest section of the trench in said plane.

6. The method of claim 5, wherein, in each plane defined by a diameter ranging between $d_{min}$ et $d_{maj}$, the thickness of the rear portion of each preform ranges between the sum of seven eighths of the narrowest section and one eighth of the thickest section of the trench in said plane, and the sum of seven eighths of the thickest section and of one eighth of the narrowest section of said trench in said plane.

7. The method of any of claim 1, wherein the bottom of the front half-die is rounded.

8. The method of claim 1 wherein the pattern cavities in the front and rear half-dies extend to form stops at the surface of the rear portions of the dogs.

9. The method of claim 1, wherein the dogs are asymmetrical with respect to a central longitudinal plane of the dogs.

* * * * *